April 16, 1946.  G. T. BRISTOL  2,398,355
ROD FEED DEVICE
Filed July 28, 1944
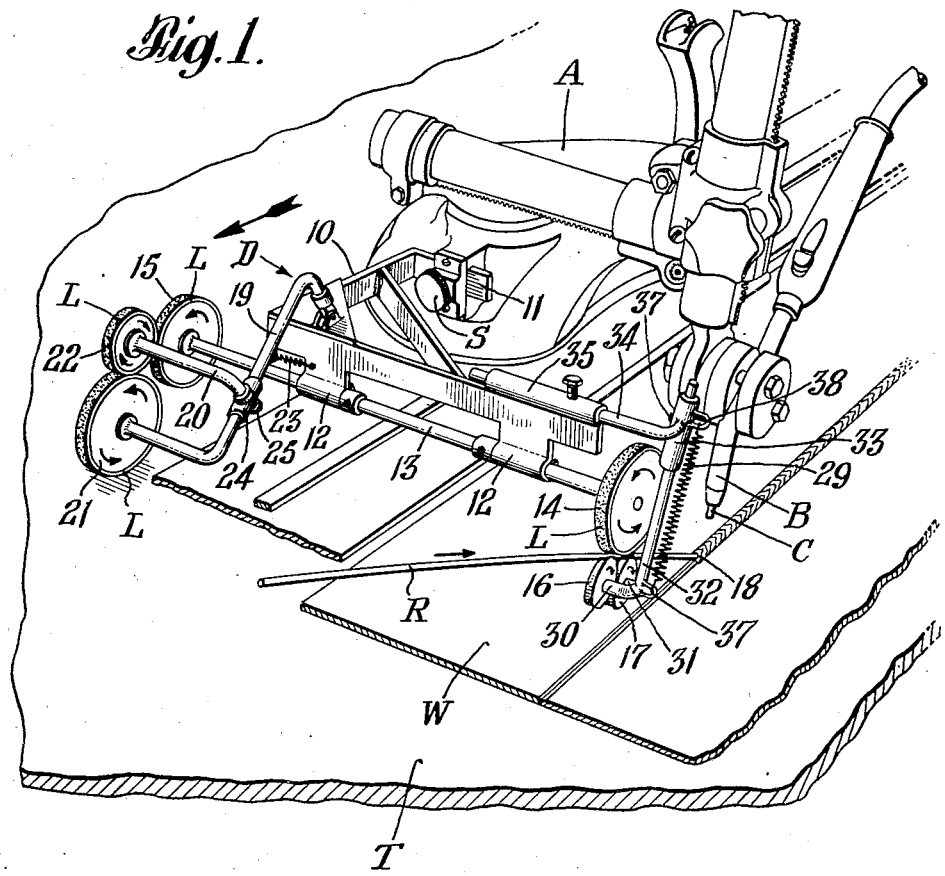
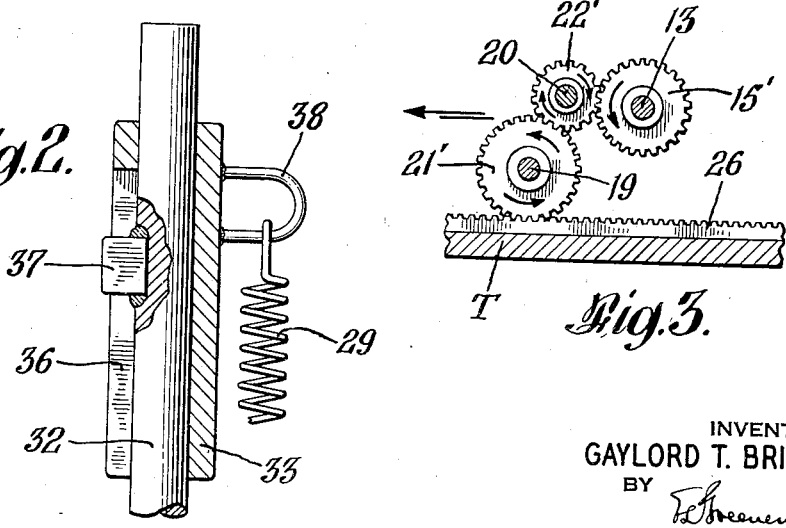
INVENTOR
GAYLORD T. BRISTOL
BY
ATTORNEY Patented Apr. 16, 1946

2,398,355

UNITED STATES PATENT OFFICE 2,398,355

ROD FEED DEVICE

Gaylord T. Bristol, Niagara Falls, N. Y., assignor to The Linde Air Products Company, a corporation of Ohio Application July 28, 1944, Serial No. 547,025

5 Claims. (Cl. 140—125)

This invention relates to a rod feed device and more particularly to a rod feed attachment for cutting and welding machines.

There exists a need for a simple, inexpensive and lightweight attachment that may be applied to a carriage, such as that employed in electric or gas cutting or welding machines, for feeding a rod toward the work as the carriage travels with respect to the work, or as the work travels with respect to the carriage which may in such case be stationary. For example, there is a need for welding rod or electrode feed devices adaptable to straight line welding processes in which the filler rod or electrode is melted into the V or weld seam without any weaving motion. There also is a need for some simple means to feed a rod or wire composed of material such as iron which is thermochemically active with oxygen to assist in the oxy-acetylene cutting of stainless steel for example.

According to this invention, there is provided a rod feed device, whereby the rod is suitably supported, and continuously delivered, to the working zone at the desired rate, which satisfies such need.

In many welding processes, especially the welding of light-gage metal sheet, bronze welding, brazing, etc., the amount of welding rod or filler metal consumed, measured in linear inches, is substantially equal to the length of the weld seam, and the operator chooses a rod or electrode of an appropriate diameter, or cross-sectional area, either properly to fill the V in the case of beveled plates or sheets, or to provide the necessary supporting bead when the abutting edges are substantially vertical planes. It will, of course, be obvious also that the invention is equally well adapted to those multi-pass welding processes in which the V is filled, or the supporting bead provided, by a series of successive layers of deposited metal.

In the drawing:

Fig. 1 is a perspective view of apparatus exemplifying the invention for "Heliarc" welding;

Fig. 2 is an enlarged fragmentary cross-sectional view; and

Fig. 3 is a fragmentary view in side elevation of a modification.

By way of example the invention is illustrated as applied to a specific adaptation of the "Heliarc" process for the welding of magnesium or magnesium alloy plate or sheet W, but it will be obvious that the invention may be employed in other processes. Generally speaking, the device may be used in those arc welding processes in which an arc is not held between the filler rod and the workpiece, and in most gas welding and cutting processes. The device of the invention is adapted to be mounted upon any movable member A or equivalent, or support, either integral with or separate from the cutting or welding means in such manner that it will be propelled in a path parallel to the axis of a kerf or weld seam.

As shown in the drawing, a frame 10 is provided with a suitable element 11 adapted to cooperate with means including a screw S for securably attaching the rod feed device D to the movable welding member A, the particular form of such securing means and element depending largely upon the form of the movable member A. The frame 10 is provided with a pair of bearings 12, within which is rotatably disposed a substantially horizontal shaft 13. The bearings are provided to reduce to a minimum the friction resulting from the pressing relationship, as described below, of the frame 10 and shaft 13. Mounted on opposite ends of shaft 13 for rotation therewith are roller wheels 14 and 15, the purpose of which is to transform the linear motion of the ensemble, and so to urge a filler rod R over a pair of peripherally grooved guide rolls 16 and 17 to a deposition zone 18 on the workpiece W.

In operation, a "Heliarc" welding head B is lowered to the proper distance above the work W and an arc is held between an electrode C and the work at the zone 18, the filler rod R being continuously melted at its end as the entire assemblage comprising the welding head B, the support member A, and the device D, moves forward, the filler rod or electrode R, as described later, being simultaneously fed through the guide rolls 16 and 17 to the zone 18.

In addition to the shaft 13 there is pivotally mounted upon the frame 10 a bracket 19 to which is secured an arm 20, such parts respectively carrying at their ends friction-drive wheels 21 and 22, which wheels are so mounted as to turn freely about axes which are substantially parallel to the shaft 13. As indicated in the drawing, the three roller wheels 15, 22 and 21 are disposed in respective pressing relationship by a spring 23, for purposes to be later described. The bracket 19 and arm 20 may be adjustable by a sleeve 24 and set screw 25, in order that substitution, in the case of wheels 15, 22 and 21, of wheels of different size may be made, as described later.

The roller wheel 15 and friction drive wheels 21 and 22 might be replaced, as shown in Fig. 3, by appropriately toothed gears 15', 21' and 22', movement of gear 21' being caused by a rack 26 mounted on a worktable T, permitting proper meshing of the teeth of the drive wheel 21'.

The frame 10, or some appropriate part thereof, such as the spring 23, is relatively resilient, and in mounting, is so positioned with respect to the plane of the worktable or guide channel, that the wheel 21 exerts a downward pressure upon the said worktable or guide channel or other supporting surface, thus causing such wheel 21 to rotate as the welding member A moves forward or backward over such surface. In the illustrated example, this movable member A is an oxyacetylene cutting machine carriage.

The roller wheels 15, 22 and 21, are provided, on their peripheral edges, with a layer L of rubber, or its equivalent, and are disposed, as above described, in respective pressing relationship, the motion of the movable member A causing rotation of the supporting-surface engaging wheel 21, and thence, respectively, the wheels 22 and 15, the shaft 13 and, finally, the rod feeding wheel 14. Wheel 14, as in the case of the other roller and friction drive wheels, is also provided on its peripheral edge with a layer L of rubber, or its equivalent, or alternatively, it might be knurled, so that when the filler rod R is pressed thereagainst, rotation of the said wheel 14 will cause forward or backward motion of such filler rod. The two grooved guide rolls or rollers 16 and 17, and the roller wheel 14, provide a three-point support which insures maintenance of the proper welding angle of the filler rod R with respect to the work W.

The pressing relationship of wheel 14, the filler rod R, and grooved rod-guide rolls or wheels 16 and 17, is accomplished by a tension spring 29. The peripherally grooved rod-guide wheels 16 and 17 are rotatably mounted on angularly disposed ends 30 and 31 of a bifurcated rod member 32, which is slidably mounted for limited movement in a direction substantially perpendicular to the axis of rotation of the wheel 14, within a tubular portion 33 of a bracket 34. This bracket 34 is, in turn, slidably mounted for adjustment in a direction which is substantially parallel to the axis of rotation of the wheel 14, within a tubular portion 35 of the frame 10. The tubular portion 33 of the bracket 34 is provided with a vertical slot 36, which accommodates for vertical movement, a tongue 37 thus insuring the absence of any substantial twisting motion of the member 32.

The spring 29, which biases the rod-guide rollers 16 and 17 against the filler rod R and thus holds the filler rod between the guide rollers and the rod-feed wheel 14, is attached at one end to the lower part of the rod member 32 and at the other end at a point directly above on the outer surface of the tubular portion 33 of the bracket 34, by U members 37 and 38, respectively.

In the illustration, the wheel 15 is substantially equal in circumference or diameter to wheel 14. Following well-known principles, it is obvious that in such case the amount of rod deposited will be substantially equal in linear inches to the forward path of the ensemble, also measured in linear inches, since the filler rod R is fed through the guide rollers 16, 17 and wheel 14 at a rate substantially equal to the forward movement of the device D, although in the opposite direction. Occasions might arise, however, when it might be desirable to feed the filler rod R at a rate greater or less than that described, for example, when rod of an appropriate size may not be available for a workpiece W of a given thickness. Such deposition of greater or lesser amounts of filler rod R may then be accomplished by the device of the invention by the substitution of a larger or smaller roller wheel 15. Thus, when the ratio of the circumference of wheel 15 to wheel 14 is greater than 1, the amount of filler rod deposited will be less in linear inches than the length of the path of movement of the device. When on the other hand, such ratio is less than 1, the amount of rod deposited will be greater than such path length. It is, of course, obvious that the illustrated apparatus is adjustable to accommodate such wheels of different size; that is, the relative positions of wheels 15, 22, and 21 are adjustable by changing the position of arm 20 and sleeve 24 on bracket 19. It should also be pointed out that adjustments in the welding blowpipe or arc will be necessary for the different conditions thus postulated.

Although the invention has been described and illustrated as applied to a particular form of apparatus, it is obvious that mechanical alterations of a minor character may be made in such apparatus without departing from the spirit of the invention. The bracket 19 may be secured to the frame 10 in such a way that the spring 23 may be omitted, the inherent resilience of the parts being sufficient to press or bias the wheel 21 against the supporting surface, so that the wheel is driven by movement of the carriage carrying the device.

I claim:

1. A rod feed device adapted to be attached to a carriage, said device comprising a frame provided with a member attachable to such carriage, bearing means on said frame, a substantially horizontal shaft mounted to rotate freely in said bearing means, wheels mounted on the opposite ends of said shaft for rotation therewith, a bracket secured to said frame, a supporting-surface engaging drive wheel mounted on said bracket, a motion transmitting wheel mounted on said last named frame and engaging said drive wheel and one of said roller wheels, means including a pair of idler wheels for biasing a rod into engagement with the other roller wheel mounted on said shaft, so that the rod is fed toward the work by movement of the carriage with respect to such surface, said wheels and rollers all being rotatable about substantially parallel horizontally disposed axes.

2. A rod feed device adapted to be attached to a carriage, said device comprising a frame provided with a member attachable to such carriage, bearing means on said frame, a substantially horizontal shaft mounted to rotate freely in said bearing means, wheels mounted on the opposite ends of said shaft for rotation therewith, a bracket secured to said frame, a supporting-surface engaging drive wheel mounted on said bracket, a motion transmitting wheel mounted on said last named frame and engaging said drive wheel and one of said roller wheels, a spring connected between said frame and bracket for biasing the drive wheel into engagement with the supporting surface, means including a pair of idler wheels for biasing a rod into engagement with the other roller wheel mounted on said shaft, so that the rod is fed toward the work by movement of the carriage with respect to such surface, said wheels and rollers all being rotatable about substantially parallel horizontally disposed axes.

3. A filler rod feed device for automatic welding processes comprising a frame provided with an appropriate member for securably attaching said frame to a movable welding head, bearings carried by said frame, a shaft mounted for free rotation in said bearings, two wheels having rubber-covered peripheral edges mounted on the ends of said shaft, said wheels acting respectively as shaft-driving and rod-driving means, bracket means secured to said frame, friction wheels rotatably mounted on said bracket means, said last named wheels being in respective pressing relationship with a supporting surface and the shaft-driving wheel, such pressing relationship of the lowermost friction wheel being accomplished through the resiliency of at least a portion of the said frame, a bifurcated rod member slidably mounted on the said frame, said rod member having angularly disposed ends, a pair of peripherally grooved guide rollers rotatably mounted on the angularly disposed ends of said rod member, a spring biasing said rollers toward the peripheral edge of said rod-driving wheel, thus providing a rod guide channel with a three-point support for maintaining a filler rod at the correct welding angle, and for feeding and guiding such rod toward the zone of metal deposition where the rod is fused and properly deposited, the linear rate of such filler rod movement through the said guide channel being equal to, or less or greater than the linear movement of the said movable welding element according as the ratio of the circumferences of the shaft-driving wheel to the rod-driving wheel is one, greater than one or less than one.

4. A rod feed device comprising a frame, a substantially horizontal shaft journalled to said frame, a pair of rubber-covered wheels secured to said shaft, a supporting-surface engaging drive wheel mounted on said frame, a motion-transmitting wheel mounted on said frame between said drive wheel and one of the wheels secured to said shaft, a pair of peripherally grooved rollers facing the periphery of the other wheel scured to said shaft, means supporting said rollers on said frame for movement toward and away from said last named wheel, and spring means biasing said roller supporting means so that said rollers are urged toward the wheel, forming a rod guide and feed means, said rollers and wheels all being rotatable on axes that are substantially parallel with said shaft.

5. A rod feed device comprising a frame, a rod engaging and feeding wheel mounted on said frame, a member carried by said frame for limited movement in a direction that is perpendicular to the axis of rotation of said wheel, a pair of rod guiding rollers mounted on said member for rotation about axes that are substantially parallel to that of said wheel, such axes being disposed symmetrically on opposite sides of a plane containing the axis of rotation of said wheel, and a spring connected between said frame and said member, said spring biasing said rollers toward said wheel, said wheel having a rod-engaging periphery, and said rollers having peripheral rod-guiding grooves facing such rod-engaging periphery, providing a rod-guide channel with a three-point support for maintaining the free end portion of a rod in proper position as the free end portion of the rod is axially advanced while the outer end thereof is consumed.

GAYLORD T. BRISTOL.